United States Patent [19]

Edgren et al.

[11] 4,397,799

[45] Aug. 9, 1983

[54] PROCESS FOR DRYING AND EXPANDING MICROSPHERES

[75] Inventors: Anders T. Edgren, Sundsvall; Lars-Olof Svedberg, Kvissleby, both of Sweden

[73] Assignee: KemaNord AB, Stockholm, Sweden

[21] Appl. No.: 332,195

[22] Filed: Dec. 18, 1981

[30] Foreign Application Priority Data

Jan. 14, 1981 [SE] Sweden .................. 8100181

[51] Int. Cl.³ .................................. B29D 27/00
[52] U.S. Cl. ......................... 264/53; 264/41; 264/DIG. 6; 521/57
[58] Field of Search ............... 264/51, 53, 41, DIG. 6; 521/57

[56] References Cited

U.S. PATENT DOCUMENTS

| 2,797,201 | 6/1957 | Veatch et al. ............... 521/57 |
| 3,611,583 | 10/1971 | Anderson et al. ............. 34/9 |
| 3,615,972 | 10/1971 | Morehouse et al. ........... 156/79 |
| 3,651,182 | 3/1972 | Rosenthal .................. 264/51 |
| 3,779,941 | 12/1973 | Powell ..................... 252/316 |
| 3,914,360 | 10/1975 | Gunderman et al. ........... 264/51 |

FOREIGN PATENT DOCUMENTS

| 2135721 | 1/1972 | Fed. Rep. of Germany . |
| 1079541 | 1/1965 | United Kingdom . |
| 1202341 | 2/1969 | United Kingdom . |

OTHER PUBLICATIONS

"Spray Drying"-Industrial & Engineering Chem., vol. 60, No. 10, pp. 53–63.

Primary Examiner—Philip E. Anderson
Attorney, Agent, or Firm—Fred Philpitt

[57] ABSTRACT

The present invention relates to a process for drying and expanding microspheres whereby first a dispersion of the microspheres in an inert liquid is prepared. This dispersion is then atomized in a hot inert gas. The process of the invention is advantageously carried out in a spray dryer.

13 Claims, 1 Drawing Figure

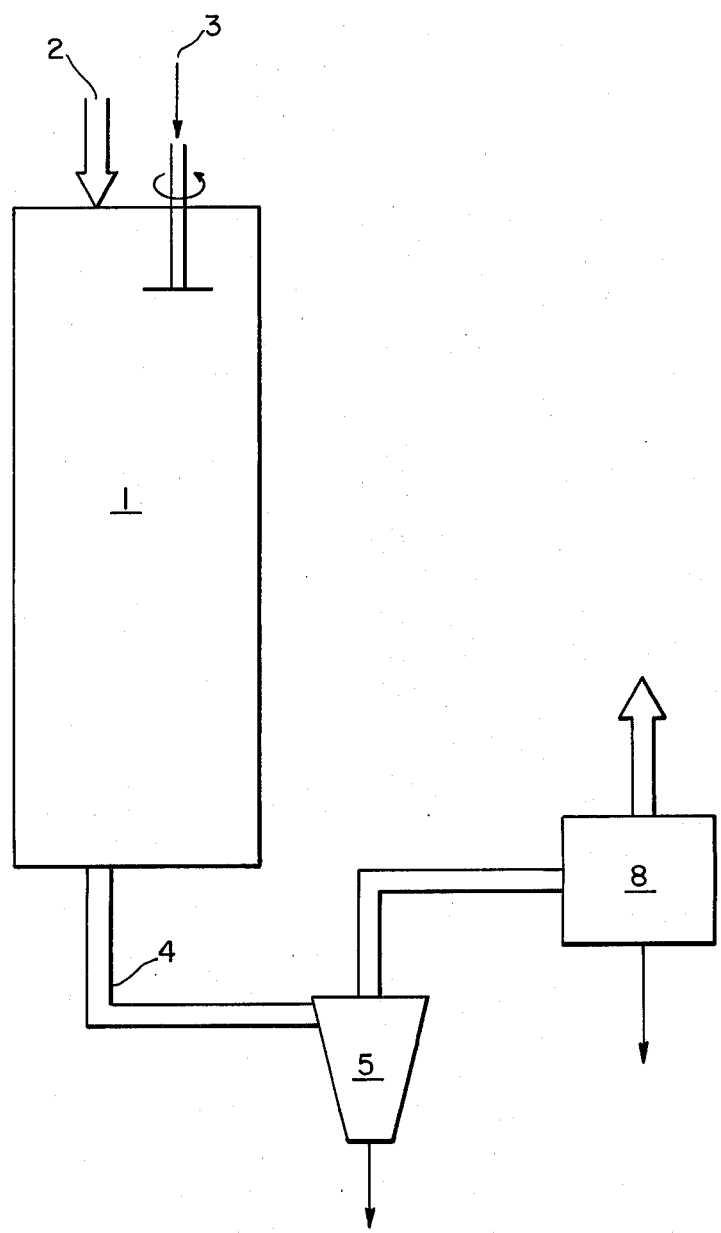

PROCESS FOR DRYING AND EXPANDING MICROSPHERES

The present invention relates to a process for drying and expanding polymeric particles. In particular the invention relates to a process for drying and expanding particles which particles comprise a thermoplastic shell encapsulating a blowing agent. The invention is particularly concerned with drying and expanding microspheres.

Expandable microspheres, their production and use are disclosed in the U.S. Pat. No. 3,615,972. The thermoplastic shell of these particles can for example consist of polymers or copolymers formed from monomers such as vinyl chloride, vinylidene chloride, acrylonitrile, methacrylate or styrene. The particle size of the unexpanded spheres, and thus also of the expanded spheres, can vary within wide limits and is selected with respect to the desired properties of the finished product. Particle sizes for unexpanded spheres can for example be 1 $\mu$m to 1 mm, preferably 2 $\mu$m to 0.5 mm and particularly 5 $\mu$m to 50 $\mu$m. The diameter of the particles increase at expansion by a factor 2 to 5. The unexpanded spheres contain volatile, liquid blowing agents which are vaporized at heating. These blowing agents can for example be freons such as trichlorofluoromethane, hydrocarbons such as n-pentane, i-pentane, neo-pentane, butane, i-butane or other blowing agents conventionally used for this type of microspheres. The blowing agent may suitably make up 5 to 30 percent by weight of the weight of the microspheres. Expancel ® is an example of a suitable, commercially available microsphere product which has a thermoplastic shell of a vinylidene/acrylonitrile copolymer and contains iso-butane as a blowing agent.

The expanded particles can be used in several fields of application, e.g. for insulation purposes, in the graphic industry and in the textile industry.

In certain cases it might be suitable to use unexpanded microspheres which are incorporated in a matrix and when this is heated the microspheres expand in situ. However, in the preparation of syntactical foams it is often customary to incorporate pre-expanded microspheres in the matrix. The type of matrix for the expanded particles depends on the particular composition of expanded particles and matrix which it is desired to prepare, and generally the character of the matrix should be such that it does not chemically affect or physically deform the expanded particles, and such that it allows the particles to remain in the prepared composition.

One process for preparing expanded synthetical microspheres is described in the Swedish patent application No. 363 265. According to this method an exposed layer of microspheres is deposited on a moving surface. The microspheres are deposited from a dispersion of spheres in a liquid which is a non-solvent for the expanded microspheres, and which contains a flocculating agent. The exposed layer is then brought into a heated zone and the moving surface is heated from a location which at the same time is remote from the microspheres and adjacent to the surface, to a temperature and for such a time as is sufficient for drying and expanding the microspheres. A stream of gas is contacted with the dried and expanded microspheres and dried, expanded microspheres are removed from the moving surface.

This known method is, however, disadvantageous in several aspects, and particularly it should be mentioned that the obtained expanded microspheres are not free-flowing and that a non-uniform product is easily obtained due to the non-uniform expansion which occurs when already expanded particles surround unexpanded particles and heat insulate these, preventing them from being expanded. It has now been found that it is possible to eliminate these disadvantages and produce uniformly expanded particles which are free-flowing and dry. The microspheres expanded according to the present invention also show a good dispersability in e.g. polyesters.

The method of the present invention is characterized in that a dispersion of unexpanded microspheres in an inert liquid is atomized and the atomized dispersion is brought into contact with warm, inert gas. The inert liquid is preferably water and the inert gas is preferably air. The dry content of the dispersion may vary within wide limits and it has been found suitable that the dispersions have a dry content between 25 and 50 percent, perferably between 35 and 45 percent. The temperature of the dispersion is not critical and may vary within wide limites, e.g. between environmental temperature (room temperture) and the temperature at which the dispersion is produced. Neither is the temperature of the introduced air critical relative to the risk of overexpansion of the microspheres as the introduced air during the first stage of the drying/expansion-process according to the invention is used to vaporize the water. The temperature and the amount of the continuously supplied air are selected with respect to the temperature and dry content of the dispersion in such a manner that the temperature of the air, which surrounds the microspheres, in the second stage of the process, i.e. the expansion stage, does not exceed 180° C. The air temperature in the expansion stage should suitably be between 80° and 150° C., and preferably between 90° and 120° C., while the temperature of the supplied air can vary between 140 and 300, peferably between 160 and 250 and particularly between 180° and 200° C. If the temperature exceeds 180° C. during the expansion stage the microspheres will be over-expanded, they will collapse and a non-desired product will be obtained. A suitable manner of adjusting the expansion temperature within the mentioned limits is to adjust the amount of the introduced dispersion with the aid of the pump which feeds the dispersion. The atomization of the dispersion can be carried out in a so-called atomizer or a spraying device which for example can consist of one or more discs or nozzles. To make the expansion as uniform as possible and to avoid clogging of the atomizer the dispersion supplied to the atomizer should be as homogenous as possible and it should thus have been subjected to careful stirring, optionally in combination with screening, immediately before it is fed to the atomizer.

The attached drawing is a schematic illustration of an apparatus for carrying out the invention.

The process of the invention is suitably carried out in an elongated device 1, which preferably is tubular. In one end of the device is an atomizing means 3 for the dispersion of microspheres and water and an inlet 2 for the hot air are arranged. In the other end of the device there is an outlet 4 for air containing expanded microspheres, which outlet is connected to a collecting device 5, 8 for the expanded microspheres.

It has been found suitable to carry out the process of the invention in a conventional spray dryer.

Compared with the known method for drying and expanding microspheres, disclosed in the Swedish patent application No. 363 265 mentioned earlier, the process of the present invention gives, besides the earlier mentioned advantages, also the advantage of making it possible to work with comparatively small amounts of dispersion in special-built hot air dryers, while the known method, which is stationary, requires large volumes. Further, at in the known method problems easily arise at the supply of the dispersion as it is required to deposit an even and thin layer of the dispersion to a belt, while as has been mentioned above, according to the present invention the dispersion is simply pumped to the atomizer, which divides it finely.

The invention is further illustrated in the following non-limiting example.

EXAMPLE

A 44-percent mixture of microspheres in water was prepared. The microspheres has a shell of thermoplastic material of vinylidene chloride and acrylonitrile and the blowing agent was iso-butane. To secure a homogenous dispersion the mixture of microspheres and water was carefully stirred and the obtained dispersion was passed through a sieve. The amounts of supplied dispersion and hot air were such that a temperature of about 200° C. of the supplied air ws suitable to achieve the desired temperature of 100°–110° C. in the later part of the spray dryer.

During the first part of the process in the spray dryer all heat energy is required to remove the water which surrounds the microspheres. When the microspheres approach the part of the spray dryer where the temperature has dropped to about 100° C. the water has been evaporated and the microspheres have dried, and the expansion can now begin.

The microspheres which do not expand (3–15 μm) will be very heavy relative to their volume and they fall down out of a cyclone separator 5 while the expanded microspheres continue to a filter 8 where they are collected at 9. The obtained microspheres were free-flowing, they had a solids content of 99% and a density of 30–35 kg/m$^3$.

I claim:

1. A process for drying and expanding microspheres having thermoplastic shells encapsulating a blowing agent, comprising the steps of
   (a) providing a dispersion of the unexpanded microspheres, in sizes between 1 μm and 1 mm, in a volatile liquid that is inert to and a non-solvent for the thermoplastic microspheres,
   (b) atomizing the dispersion having an amount up to 50% of the unexpanded microspheres in a stream of hot, inert gas having a temperature sufficient to:
      (i) in a first stage said volatile liquid is vaporized and
      (ii) in a second stage the microspheres are expanded by evaporation of the blowing agent at a temperature which initiates expansion of the microspheres,
   (c) feeding the gas stream containing the expanded microspheres to a separator for the microspheres, and
   (d) collecting from the separator of a product of dry, free-flowing and discrete microsphere particles.

2. A process according to claim 1 in which the liquid is water and the inert gas is air.

3. A process according to claim 1 in which the dispersion of microspheres has a dry content of 25 to 50 percent.

4. A process according to claim 1 in which the temperature in the mixture of microspheres and gas at the final stage of expansion is 80–150 degrees centigrade.

5. A process according to claim 4 in which the temperature at the final stage of expansion is 90–120 degrees centigrade.

6. A process according to claim 1 in which the temperature of the entering gas is between 140 and 300 degrees centigrade.

7. A process according to claim 6 in which the temperature of the entering gas is between 160 and 250 degrees centigrade.

8. A process according to claim 7 in which the temperature of the entering gas is between 180 and 200 degrees centigrade.

9. A process according to claim 1 in which the shell of the microspheres consists of a copolymer of vinylidene chloride and acrylonitrile.

10. A process according to claim 1 in which the blowing agent is iso-butane.

11. A process according to claim 1 in which the atomization is carried out with the aid of atomizing discs or nozzles.

12. A process according to claim 1 in which the process is carried out in a spray dryer.

13. A process according to claim 1 in which the expanded microspheres are collected in a collecting device which separates air, such as a filter or a cyclone.

* * * * *